May 17, 1955　　　A. G. FEELEY　　　2,708,732
HIGH VOLTAGE, DIRECT CURRENT POWER SUPPLIES
Filed Feb. 26, 1954
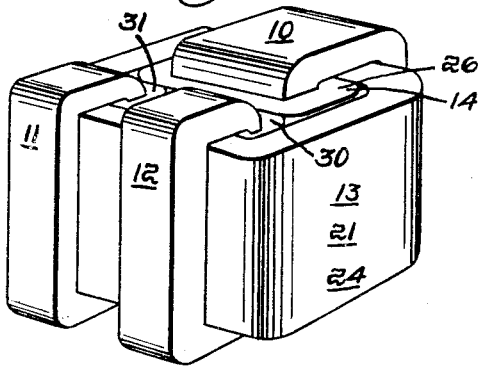
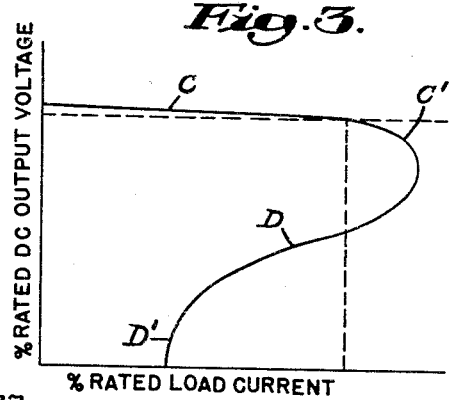
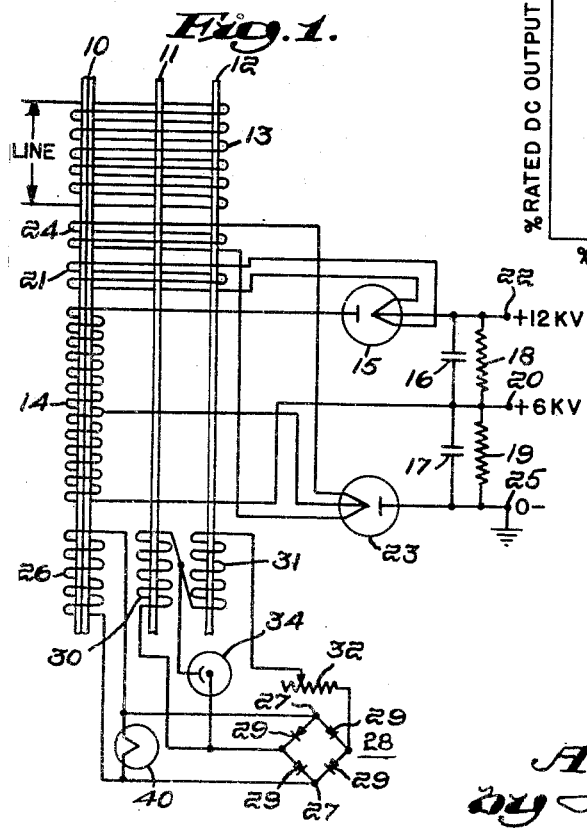
Inventor:
Albert G. Feeley,
by Robert J. Palmer
Attorney

United States Patent Office 2,708,732
Patented May 17, 1955

2,708,732

HIGH VOLTAGE, DIRECT CURRENT POWER SUPPLIES

Albert G. Feeley, Euclid, Ohio, assignor to Westinghouse Electric Corporation, East Pittsburgh, Pa., a corporation of Pennsylvania Application February 26, 1954, Serial No. 412,715

10 Claims. (Cl. 321—16)

This invention relates to high voltage, direct current power supplies, and has as an object to simplify such supplies.

The A. C. Fields Patent No. 2,632,532 discloses a high voltage, direct current power supply which is widely used for energizing the electrodes of electrostatic precipitators, and which requires two transformers, and a separate saturable reactor for voltage regulation. The present invention is an improvement over that of the Fields patent in that all of the electrical windings are combined in one compact transformer unit.

This invention will now be described with reference to the drawings, of which:

Fig. 1 is a circuit schematic illustrating one embodiment of this invention;

Fig. 2 is a projected view of the transformer used in the circuit of Fig. 1, and Fig. 3 is the characteristic curve of the circuit.

The transformer has a main core 10 and two saturable cores 11 and 12 which are electrically linked as illustrated by Fig. 2 of the drawings. The primary winding 13 which is adapted to be connected to a 60 cycle, 115 volt, alternating current source, is wound on all three cores 10, 11 and 12 so as to serve as a common primary winding for the three cores.

The high voltage secondary winding 14 is wound on the core 10 only, and has one end connected to the anode of the diode 15, and has its other end connected to the junction points of the series connected capacitors 16 and 17 and of the series connected resistors 18 and 19, and to the +6 kv. output terminal 20. The filament of the diode 15 is connected to the filament winding 21 which is wound on all three cores 10, 11 and 12, and the center point of the filament is connected to one side of the capacitor 16, to one side of the resistor 18, and to the +12 kv. output terminal 22.

The high voltage secondary winding 14 has a tap at about its center which is connected to the center point of the filament of the diode 23, which filament is connected to the filament winding 24 which is wound on all three cores 10, 11 and 12. The anode of the diode 23 is connected to one side of the capacitor 17, to one end of the resistor 19, and to the grounded, negative output terminal 25.

The diodes 15 and 23 are seen to be connected in a conventional voltage doubler circuit of which the capacitors 16 and 17 are the filter and storage capacitors.

The main core 10 has the secondary winding 26 which is a control winding, wound thereon only, and which is connected at 27 to the input of the bridge rectifier 28 which contains the four rectifiers 29. The signal lamp 40 which is of the filament type, has its filament connected across the control winding 26. When the lamp 40 is lighted, it indicates normal operation of the power supply.

The cores 11 and 12 are saturable cores which, in normal operation, are biased to saturation in opposite directions so that normally they have no effect upon the operation of the circuit. The bias windings 30 and 31 are wound on the cores 11 and 12 respectively, and are connected in series and so wound that their induced voltages cancel.

The bias windings 30 and 31 are connected in series with the variable resistor 32 across the output of the rectifier 28. The resistor 32 can be adjusted to vary the saturating current supplied by the rectifier 28 to the bias windings 30 and 31. The neon lamp 34 which is an overload indicating signal lamp, is connected across the bias winding 30.

*Operation*

In operation, under normal operating conditions represented by that portion of the characteristic curve of Fig. 3, between C and C', the voltage across the control winding remains constant at, for example, about 17 volts so that the normal operation signal lamp 40 connected across the control winding, will be lighted. The rectified current from the rectifier 28 flowing through the bias windings 30 and 31 saturates the cores 11 and 12. The voltage across the bias winding 31 is substantially zero so that the overload signal lamp 34 will not be lighted.

When the load on the high voltage winding 15 exceeds about 125% of its rated value, the impedance reflected from the high voltage winding 14 into the primary winding 13, decreases substantially, causing an increase in the current flowing through the primary winding. The resulting increased ampere turns exceeds those of the bias windings 30 and 31, causing flux variations in the cores 11 and 12. The flux variation in the core 10 then decreases with a resulting decrease in the voltage across the control winding 26. The voltage reduction across the winding 26 causes reduced bias current from the rectifier 28 to the bias windings 30 and 31, reducing the current which saturated the cores 11 and 12. This effect is cumulative so that the cores 11 and 12 quickly become unsaturated. The resulting increase in impedance results in the output voltage drop shown by that portion between C' and D' of the characteristic curve of Fig. 3.

As the voltage across the control winding 26 decreases, the normal operation signal lamp 40 goes dim and goes out between the points C' and D on the curve of Fig. 3. Between the points C' and D, the voltage across the bias winding 31 begins to increase rapidly until at the point D on the characteristic curve, it is about 90 volts. At the point D' on the characteristic curve, this voltage is about 115 volts so that the overload signal lamp 34 lights.

In summation, under normal operating conditions (C to C' on the characteristic curve), the output voltage will remain substantially constant, and the signal lamp 40 will glow, indicating normal operation. When the load increases above about 125% of rated value (C' to D on the curve of Fig. 3), the output voltage will drop rapidly, and the lamp 40 will first become dim and then go out. When the load starts to become excessive (D to D' on the curve of Fig. 3), the signal lamp 34 will glow, indicating excessive overload.

Since the power supply of this invention is designed for energizing the electrodes of electrostatic precipitators, it has a +12 kv. output for the ionizer electrodes, and a +6 kv. output for the collector electrodes of such precipitators. Each output voltage would have a characteristic similar to that shown by Fig. 3.

While one embodiment of this invention has been described for the purpose of illustration, it should be understood that the invention is not limited to the exact circuit and circuit components illustrated and described, since modifications thereof may be suggested by those skilled in the art, without departure from the essence of the invention.

What I claim as my invention is:

1. A high voltage, direct current, power supply comprising a transformer assembly having a main core and having two saturable cores electrically linked with said main core, a primary winding wound on said main and saturable cores, a high voltage secondary winding wound on said main core only, rectifying means connected to said secondary winding for supplying high voltage direct current to a load, a control winding on said main core only, bias windings wound on said saturable cores only, and rectifying means having its input connected to said control winding and having its output connected to said bias windings.

2. The invention claimed in claim 1 in which the bias windings are connected in series and so wound that the voltage induced in one cancels the voltage induced in the other.

3. The invention claimed in claim 2 in which the saturable cores are saturated in opposite directions by the current from the second mentioned rectifying means flowing through the bias windings.

4. The invention claimed in claim 1 in which the saturable cores are saturated in opposite directions by the current from the second mentioned rectifying means flowing through the bias windings.

5. The invention claimed in claim 1 in which the first mentioned rectifying means includes a vacuum tube having a filament, and in which a filament winding wound on the main and saturable cores is connected to the filament.

6. The invention claimed in claim 5 in which the bias windings are connected in series and so wound that the voltage induced in one cancels the voltage induced in the other.

7. The invention claimed in claim 6 in which the saturable cores are saturated in opposite directions by the current from the second mentioned rectifying means flowing through the bias windings.

8. The invention claimed in claim 1 in which the first mentioned rectifying means includes a pair of vacuum tubes having filaments, and in which filament windings wound on the main and saturable cores are connected to the filaments.

9. The invention claimed in claim 8 in which the bias windings are connected in series and so wound that the voltage induced in one cancels the voltage induced in the other.

10. The invention claimed in claim 9 in which the saturable cores are saturated in opposite directions by the current from the second mentioned rectifying means flowing through the bias windings.

No references cited.